United States Patent
Adermann et al.

(10) Patent No.: US 8,553,934 B2
(45) Date of Patent: Oct. 8, 2013

(54) ORIENTING THE POSITION OF A SENSOR

(75) Inventors: Stanley W. Adermann, Redmond, WA (US); Mark Plagge, Sammamish, WA (US); Craig Peeper, Kirkland, WA (US); Szymon Stachniak, Kirkland, WA (US); David C. Kline, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 488 days.

(21) Appl. No.: 12/963,328

(22) Filed: Dec. 8, 2010

(65) Prior Publication Data

US 2012/0146902 A1 Jun. 14, 2012

(51) Int. Cl.
*G06K 9/00* (2006.01)
(52) U.S. Cl.
USPC ............................. 382/103; 382/154
(58) Field of Classification Search
USPC ................... 382/103, 154, 312; 348/46, 169
See application file for complete search history.

(56) References Cited

U.S. PATENT DOCUMENTS

| | | | |
|---|---|---|---|
| 4,288,078 A | 9/1981 | Lugo | 273/264 |
| 4,627,620 A | 12/1986 | Yang | 273/1 GC |
| 4,630,910 A | 12/1986 | Ross et al. | 354/76 |
| 4,645,458 A | 2/1987 | Williams | 4/251 |
| 4,695,953 A | 9/1987 | Blair et al. | 364/410 |
| 4,702,475 A | 10/1987 | Elstein et al. | 273/1 GC |
| 4,711,543 A | 12/1987 | Blair et al. | 352/87 |
| 4,751,642 A | 6/1988 | Silva et al. | 364/413 |
| 4,796,997 A | 1/1989 | Svetkoff et al. | 356/376 |
| 4,809,065 A | 2/1989 | Harris et al. | 358/88 |
| 4,817,950 A | 4/1989 | Goo | 273/148 B |
| 4,843,568 A | 6/1989 | Krueger et al. | 364/518 |
| 4,893,183 A | 1/1990 | Nayar | 358/107 |
| 4,901,362 A | 2/1990 | Terzian | 382/22 |
| 4,925,189 A | 5/1990 | Braeunig | 273/148 B |
| 5,101,444 A | 3/1992 | Wilson et al. | 382/48 |
| 5,142,357 A * | 8/1992 | Lipton et al. | 358/88 |

(Continued)

FOREIGN PATENT DOCUMENTS

CN 101254344 B 6/2010
EP 0583061 A2 2/1994

(Continued)

OTHER PUBLICATIONS

Toyama, Kentaro, et al., "Probabilistic Tracking in a Metric Space," Eighth International Conference on Computer Vision, Vancouver, Canada, vol. 2, Jul. 2001, 8 pages.

(Continued)

*Primary Examiner* — Andrew W Johns
(74) *Attorney, Agent, or Firm* — Vierra Magen Marcus LLP

(57) ABSTRACT

Techniques are provided for re-orienting a field of view of a depth camera having one or more sensors. The depth camera may have one or more sensors for generating a depth image and may also have an RGB camera. In some embodiments, the field of view is re-oriented based on the depth image. The position of the sensor(s) may be altered to change the field of view automatically based on an analysis of objects in the depth image. The re-orientation process may be repeated until a desired orientation of the sensor is determined. Input from the RGB camera might be used to validate a final orientation of the depth camera, but is not required to during the process of determining new possible orientation of the field of view.

20 Claims, 14 Drawing Sheets

(56) References Cited

U.S. PATENT DOCUMENTS

| | | | |
|---|---|---|---|
| 5,148,154 A | 9/1992 | MacKay et al. | 340/712 |
| 5,184,295 A | 2/1993 | Mann | 364/410 |
| 5,229,754 A | 7/1993 | Aoki et al. | 340/705 |
| 5,229,756 A | 7/1993 | Kosugi et al. | 340/706 |
| 5,239,463 A | 8/1993 | Blair et al. | 364/410 |
| 5,239,464 A | 8/1993 | Blair et al. | 364/410 |
| 5,288,078 A | 2/1994 | Capper et al. | 273/148 B |
| 5,295,491 A | 3/1994 | Gevins | 128/731 |
| 5,320,538 A | 6/1994 | Baum | 434/307 |
| 5,347,306 A | 9/1994 | Nitta | 348/15 |
| 5,385,519 A | 1/1995 | Hsu et al. | 482/54 |
| 5,405,152 A | 4/1995 | Katanics et al. | 273/438 |
| 5,417,210 A | 5/1995 | Funda et al. | 128/653.1 |
| 5,423,554 A | 6/1995 | Davis | 273/437 |
| 5,454,043 A | 9/1995 | Freeman | 382/168 |
| 5,469,740 A | 11/1995 | French et al. | 73/379.04 |
| 5,495,576 A | 2/1996 | Ritchey | 395/125 |
| 5,516,105 A | 5/1996 | Eisenbrey et al. | 273/148 B |
| 5,524,637 A | 6/1996 | Erickson | 128/779 |
| 5,534,917 A | 7/1996 | MacDougall | 348/169 |
| 5,563,988 A | 10/1996 | Maes et al. | 395/121 |
| 5,577,981 A | 11/1996 | Jarvik | 482/4 |
| 5,580,249 A | 12/1996 | Jacobsen et al. | 434/11 |
| 5,594,469 A | 1/1997 | Freeman et al. | 345/158 |
| 5,597,309 A | 1/1997 | Riess | 434/258 |
| 5,616,078 A | 4/1997 | Oh | 463/8 |
| 5,617,312 A | 4/1997 | Iura et al. | 364/188 |
| 5,638,300 A | 6/1997 | Johnson | 364/551.01 |
| 5,641,288 A | 6/1997 | Zaenglein, Jr. | 434/21 |
| 5,682,196 A | 10/1997 | Freeman | 348/13 |
| 5,682,229 A | 10/1997 | Wangler | 356/4.01 |
| 5,690,582 A | 11/1997 | Ulrich et al. | 432/4 |
| 5,703,367 A | 12/1997 | Hashimoto et al. | 250/342 |
| 5,704,837 A | 1/1998 | Iwasaki et al. | 463/38 |
| 5,715,834 A | 2/1998 | Bergamasco et al. | 128/782 |
| 5,875,108 A | 2/1999 | Hoffberg et al. | 364/146 |
| 5,877,803 A | 3/1999 | Wee et al. | 348/135 |
| 5,913,727 A | 6/1999 | Ahdoot | 463/39 |
| 5,933,125 A | 8/1999 | Fernie et al. | 345/8 |
| 5,980,256 A | 11/1999 | Carmein | 434/55 |
| 5,989,157 A | 11/1999 | Walton | 482/4 |
| 5,995,649 A | 11/1999 | Marugame | 382/154 |
| 6,005,548 A | 12/1999 | Latypov et al. | 345/156 |
| 6,009,210 A | 12/1999 | Kang | 382/276 |
| 6,054,991 A | 4/2000 | Crane et al. | 345/420 |
| 6,066,075 A | 5/2000 | Poulton | 482/8 |
| 6,072,494 A | 6/2000 | Nguyen | 345/358 |
| 6,073,489 A | 6/2000 | French et al. | 73/379.01 |
| 6,077,201 A | 6/2000 | Cheng | 482/57 |
| 6,098,458 A | 8/2000 | French et al. | 73/379.04 |
| 6,100,896 A | 8/2000 | Strohecker et al. | 345/427 |
| 6,101,289 A | 8/2000 | Kellner | 382/276 |
| 6,128,003 A | 10/2000 | Smith et al. | 345/157 |
| 6,130,677 A | 10/2000 | Kunz | 345/435 |
| 6,141,463 A | 10/2000 | Covell et al. | 382/286 |
| 6,147,678 A | 11/2000 | Kumar et al. | 345/158 |
| 6,152,856 A | 11/2000 | Studor et al. | 482/8 |
| 6,159,100 A | 12/2000 | Smith | 463/42 |
| 6,173,066 B1 | 1/2001 | Peurach et al. | 382/103 |
| 6,181,343 B1 | 1/2001 | Lyons | 345/358 |
| 6,188,777 B1 | 2/2001 | Darrell et al. | 382/103 |
| 6,215,890 B1 | 4/2001 | Matsuo et al. | 382/103 |
| 6,215,898 B1 | 4/2001 | Woodfill et al. | 382/154 |
| 6,226,396 B1 | 5/2001 | Marugame | 382/103 |
| 6,229,913 B1 | 5/2001 | Nayar et al. | 382/154 |
| 6,256,033 B1 | 7/2001 | Nguyen | 345/358 |
| 6,256,400 B1 | 7/2001 | Takata et al. | 382/103 |
| 6,262,769 B1 | 7/2001 | Anderson et al. | 348/333.1 |
| 6,283,860 B1 | 9/2001 | Lyons et al. | 463/36 |
| 6,289,112 B1 | 9/2001 | Jain et al. | 382/116 |
| 6,299,308 B1 | 10/2001 | Voronka et al. | 351/210 |
| 6,308,565 B1 | 10/2001 | French et al. | 73/379.04 |
| 6,316,934 B1 | 11/2001 | Amorai-Moriya et al. | 324/207.17 |
| 6,363,160 B1 | 3/2002 | Bradski et al. | 382/103 |
| 6,384,819 B1 | 5/2002 | Hunter | 345/418 |
| 6,411,744 B1 | 6/2002 | Edwards | 382/294 |
| 6,430,997 B1 | 8/2002 | French et al. | 73/379.04 |
| 6,476,834 B1 | 11/2002 | Doval et al. | 345/863 |
| 6,496,598 B1 | 12/2002 | Harman | 382/154 |
| 6,503,195 B1 | 1/2003 | Keller et al. | 600/160 |
| 6,539,931 B2 | 4/2003 | Trajkovic et al. | 124/34 |
| 6,570,555 B1 | 5/2003 | Prevost et al. | 345/156 |
| 6,633,294 B1 | 10/2003 | Rosenthal et al. | 345/474 |
| 6,640,202 B1 | 10/2003 | Dietz et al. | 702/167 |
| 6,661,918 B1 | 12/2003 | Gordon et al. | 382/173 |
| 6,681,031 B2 | 1/2004 | Cohen et al. | 382/103 |
| 6,714,665 B1 | 3/2004 | Hanna et al. | 382/117 |
| 6,731,799 B1 | 5/2004 | Sun et al. | 382/173 |
| 6,738,066 B1 | 5/2004 | Nguyen | 345/474 |
| 6,765,726 B2 | 7/2004 | French et al. | 359/630 |
| 6,788,809 B1 | 9/2004 | Grzeszczuk et al. | 382/154 |
| 6,801,637 B2 | 10/2004 | Voronka et al. | 382/103 |
| 6,873,723 B1 | 3/2005 | Aucsmith et al. | 382/154 |
| 6,876,496 B2 | 4/2005 | French et al. | 359/630 |
| 6,937,742 B2 | 8/2005 | Roberts et al. | 382/100 |
| 6,950,534 B2 | 9/2005 | Cohen et al. | 382/103 |
| 7,003,134 B1 | 2/2006 | Covell et al. | 382/103 |
| 7,036,094 B1 | 4/2006 | Cohen et al. | 715/863 |
| 7,038,855 B2 | 5/2006 | French et al. | 359/630 |
| 7,039,676 B1 | 5/2006 | Day et al. | 709/204 |
| 7,042,440 B2 | 5/2006 | Pryor et al. | 345/158 |
| 7,050,606 B2 | 5/2006 | Paul et al. | 382/104 |
| 7,058,204 B2 | 6/2006 | Hildreth et al. | 382/103 |
| 7,060,957 B2 | 6/2006 | Lange et al. | 250/208.1 |
| 7,113,918 B1 | 9/2006 | Ahmad et al. | 705/26 |
| 7,121,946 B2 | 10/2006 | Paul et al. | 463/36 |
| 7,170,492 B2 | 1/2007 | Bell | 345/158 |
| 7,184,048 B2 | 2/2007 | Hunter | 345/473 |
| 7,202,898 B1 | 4/2007 | Braun et al. | 348/301 |
| 7,222,078 B2 | 5/2007 | Abelow | 705/1 |
| 7,227,526 B2 | 6/2007 | Hildreth et al. | 5/156 |
| 7,259,747 B2 | 8/2007 | Bell | 345/156 |
| 7,308,112 B2 | 12/2007 | Fujimura et al. | 382/103 |
| 7,312,872 B2 | 12/2007 | Ohta | 356/400 |
| 7,317,836 B2 | 1/2008 | Fujimura et al. | 382/203 |
| 7,348,963 B2 | 3/2008 | Bell | 345/156 |
| 7,359,121 B2 | 4/2008 | French et al. | 359/630 |
| 7,367,887 B2 | 5/2008 | Watabe et al. | 463/36 |
| 7,379,563 B2 | 5/2008 | Shamaie | 382/103 |
| 7,379,566 B2 | 5/2008 | Hildreth | 382/107 |
| 7,389,591 B2 | 6/2008 | Jaiswal et al. | 33/366.11 |
| 7,412,077 B2 | 8/2008 | Li et al. | 382/103 |
| 7,421,093 B2 | 9/2008 | Hildreth et al. | 382/103 |
| 7,430,312 B2 | 9/2008 | Gu | 382/154 |
| 7,436,496 B2 | 10/2008 | Kawahito | 356/5.01 |
| 7,450,736 B2 | 11/2008 | Yang et al. | 382/103 |
| 7,452,275 B2 | 11/2008 | Kuraishi | 463/30 |
| 7,460,690 B2 | 12/2008 | Cohen et al. | 382/103 |
| 7,489,812 B2 | 2/2009 | Fox et al. | 382/154 |
| 7,536,032 B2 | 5/2009 | Bell | 382/107 |
| 7,555,142 B2 | 6/2009 | Hildreth et al. | 382/103 |
| 7,560,701 B2 | 7/2009 | Oggier et al. | 250/370.09 |
| 7,570,805 B2 | 8/2009 | Gu | 382/154 |
| 7,574,020 B2 | 8/2009 | Shamaie | 382/103 |
| 7,576,727 B2 | 8/2009 | Bell | 345/158 |
| 7,583,275 B2 | 9/2009 | Neumann et al. | 345/633 |
| 7,590,262 B2 | 9/2009 | Fujimura et al. | 382/104 |
| 7,593,552 B2 | 9/2009 | Higaki et al. | 382/118 |
| 7,593,627 B2 | 9/2009 | Wernersson | 396/50 |
| 7,598,942 B2 | 10/2009 | Underkoffler et al. | 345/158 |
| 7,607,509 B2 | 10/2009 | Schmiz et al. | 180/274 |
| 7,620,202 B2 | 11/2009 | Fujimura et al. | 382/103 |
| 7,668,340 B2 | 2/2010 | Cohen et al. | 382/103 |
| 7,680,298 B2 | 3/2010 | Roberts et al. | 382/100 |
| 7,683,954 B2 | 3/2010 | Ichikawa et al. | 348/308 |
| 7,684,592 B2 | 3/2010 | Paul et al. | 382/103 |
| 7,701,439 B2 | 4/2010 | Hillis et al. | 345/156 |
| 7,702,130 B2 | 4/2010 | Im et al. | 382/103 |
| 7,704,135 B2 | 4/2010 | Harrison, Jr. | 463/7 |
| 7,710,391 B2 | 5/2010 | Bell et al. | 345/156 |
| 7,729,530 B2 | 6/2010 | Antonov et al. | 382/154 |
| 7,746,345 B2 | 6/2010 | Hunter | 345/473 |
| 7,760,182 B2 | 7/2010 | Ahmad et al. | 345/156 |

(56) References Cited

U.S. PATENT DOCUMENTS

| | | | |
|---|---|---|---|
| 7,809,167 B2 | 10/2010 | Bell | 382/107 |
| 7,834,846 B1 | 11/2010 | Bell | 345/156 |
| 7,852,262 B2 | 12/2010 | Namineni et al. | 342/357.28 |
| RE42,256 E | 3/2011 | Edwards | 382/173 |
| 7,898,522 B2 | 3/2011 | Hildreth et al. | 345/156 |
| 8,035,612 B2 | 10/2011 | Bell et al. | 345/156 |
| 8,035,614 B2 | 10/2011 | Bell et al. | 345/158 |
| 8,035,624 B2 | 10/2011 | Bell et al. | 345/175 |
| 8,072,470 B2 | 12/2011 | Marks | 345/632 |
| 2005/0036036 A1 | 2/2005 | Stevenson et al. | 348/211.99 |
| 2007/0073439 A1 | 3/2007 | Habibi et al. | 700/213 |
| 2008/0026838 A1 | 1/2008 | Dunstan et al. | 463/30 |
| 2009/0015658 A1 | 1/2009 | Enstad et al. | 348/14.08 |

FOREIGN PATENT DOCUMENTS

| | | |
|---|---|---|
| JP | 08044490 A | 2/1996 |
| WO | 93/10708 A1 | 6/1993 |
| WO | 97/17598 A1 | 5/1997 |
| WO | 99/44698 A2 | 9/1999 |

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence, pp. 602-605.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated, 6 pages.

English Machine-translation of Japanese Publication No. JP08-044490 published on Feb. 16, 1996.

Hoedl, et al. "Real-Time Orientation of a PTZ-Camera Based on Pedestrian Detection in Video Data of Wide and Complex Scenes." The International Archives of the Photogrammetry, Remote Sensing and Spatial Information Sciences, vol. XXXVII, Part B3b, pp. 663-668. In Proceedings of the ISPRS Congress, Jul. 3-11, 2008, Beijing, China.

* cited by examiner

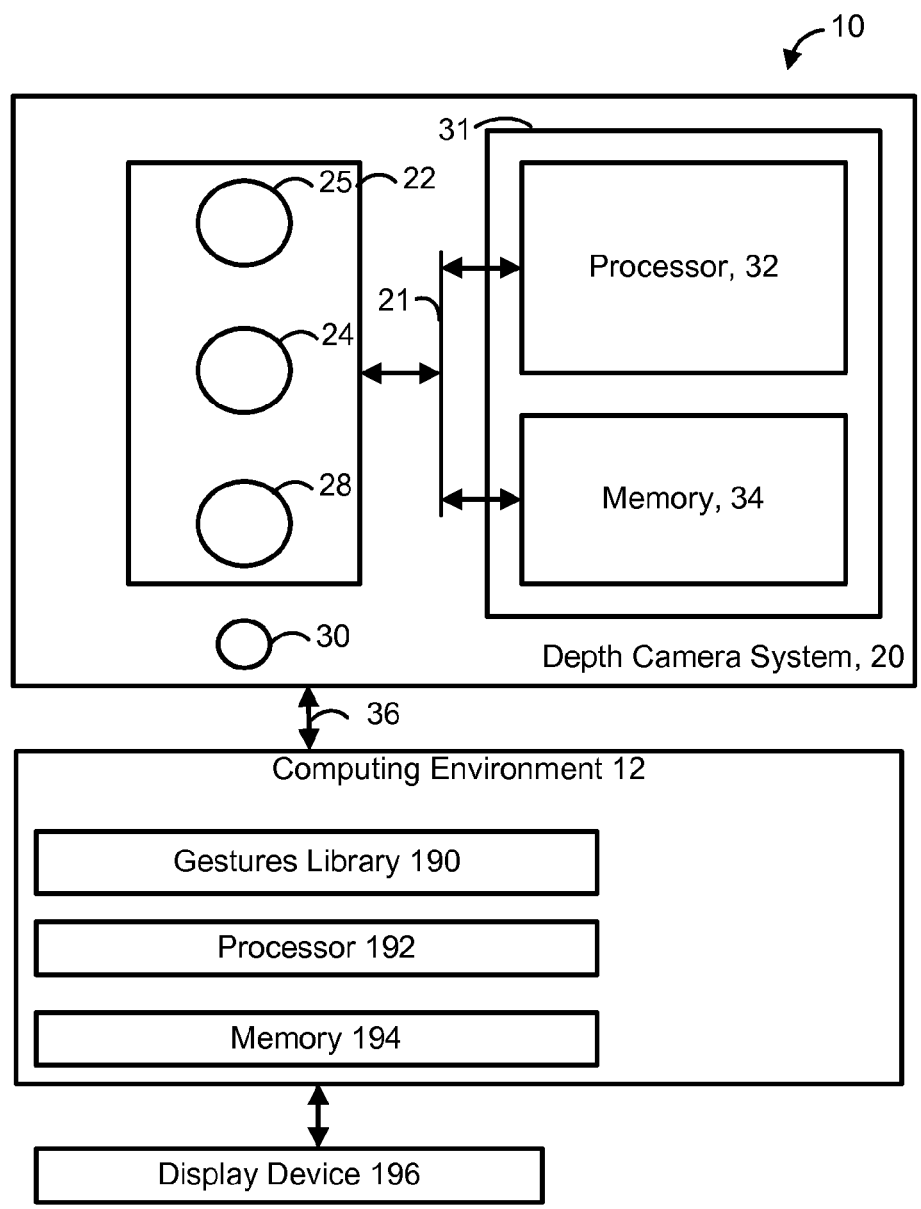

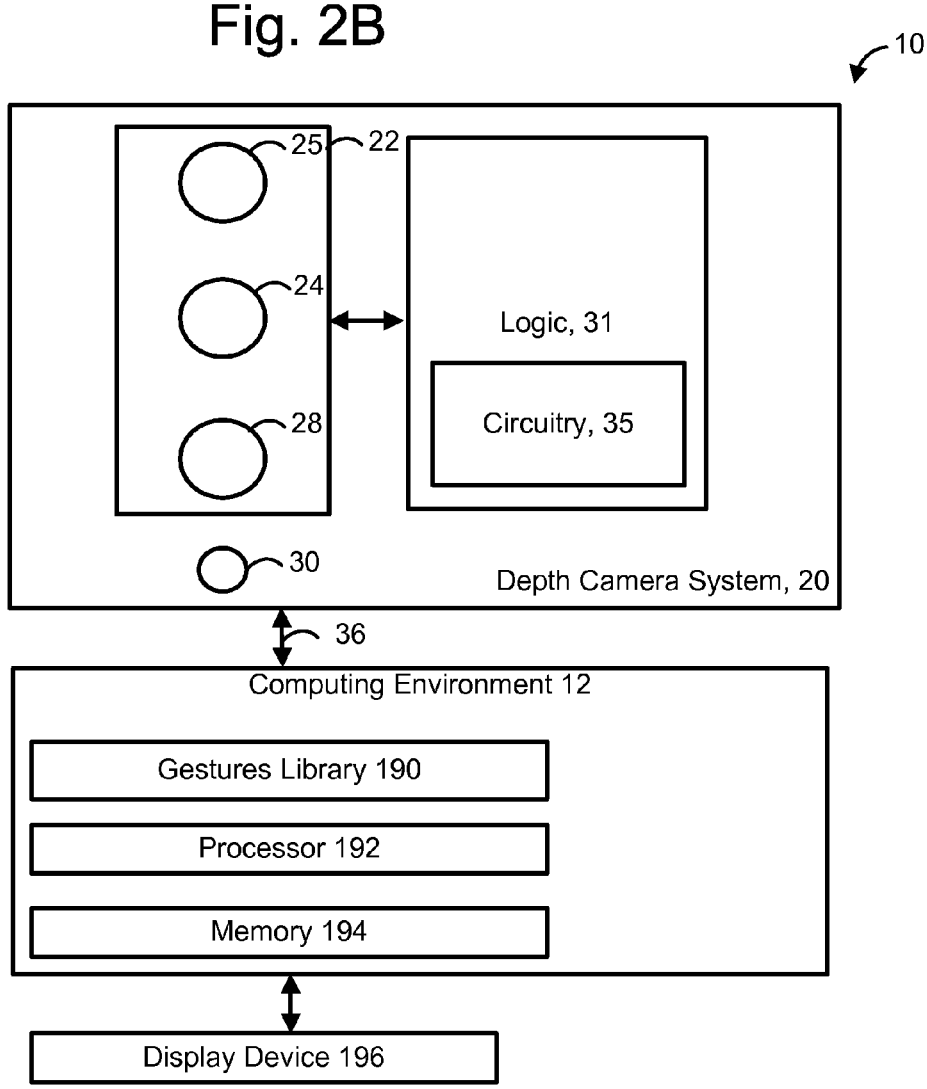

ORIENTING THE POSITION OF A SENSOR

BACKGROUND

A real-time depth camera is able to determine the distance to a human or other object in a field of view of the camera, and to update the distance substantially in real time based on a frame rate of the camera. Such a depth camera can be used in motion capture systems, for instance, to obtain data regarding the location and movement of a human body or other subject in a physical space, and can use the data as an input to an application in a computing system. Many applications are possible, such as for military, entertainment, sports and medical purposes. Typically, the depth camera includes an illuminator which illuminates the field of view, and an image sensor which senses light from the field of view to form an image. However, challenges exist such as properly orienting the depth camera such that the target object is properly in the field of view.

SUMMARY

Techniques are provided for orienting one or more sensors that may be used to collect depth information. The sensor(s) may be part of a depth camera system that has other sensors such as an RGB camera. The depth camera may have a motor to adjust the position of the sensor such that the sensor's field of view can be altered. An adjustment to the sensor's field of view may be made automatically based on an analysis of objects in a depth image. The re-orientation process may be repeated until a desired orientation of the sensor is determined.

One embodiment includes a method of orienting a sensor in a depth camera. The method may include generating a depth image from the sensor, and determining one or more potential targets based on the depth image. One of the potential targets may be selected as a candidate object to track with the sensor. A determination may be made whether to re-orient the sensor the present orientation of the sensor and a position of the candidate object in the field of view. The sensor is re-oriented the sensor if it is determined to do so. The foregoing may be repeated until it is determined not to re-orient the sensor.

One embodiment includes an apparatus comprising a depth camera having one or more sensors for collecting depth information, and logic coupled to the depth camera. The logic generates a depth image from the depth information. The logic determines one or more potential targets based on the depth image. The logic selects one of the potential targets as a candidate object to track with the sensor. The logic determines whether to re-orient the one or more sensors based on the present orientation of the one or more sensors and a position of the candidate object in the field of view. The logic re-orients the one or more sensors if it is determined to do so. The logic repeats the generating depth information, the determining one or more potential targets, the selecting, the determining whether to re-orient the one or more sensors, and the re-orienting the one or more sensors until it is either determined that a current candidate object is properly within the field of view or that there are no potential targets.

One embodiment includes a method of orienting a depth camera having a field of view and one or more sensors. The method includes: a) generating a depth image from the depth camera; b) determining zero or more potential targets based on the depth image; c) determining whether to re-orient the field of view of the depth camera if zero potential targets were determined; d) re-orienting the field of view of the depth camera if it is determined to re-orient when zero potential targets were determined; e) selecting one of the potential targets as a candidate object to track with the one or more sensors; f) determining whether to re-orient the field of view of the depth camera based on the present orientation of the sensor and the candidate object; g) re-orienting the field of view of the depth camera if it is determined to do so; and repeating a) through g) until it is determined that the field of view of the depth camera should not be re-oriented.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

FIG. 2A depicts an example block diagram of the motion capture system of FIG. 1A or 1B.

FIG. 2B depicts an example block diagram of the motion capture system of FIG. 1A or 1B that uses a hardware implementation for logic in the depth camera.

DETAILED DESCRIPTION

Techniques are provided for re-orienting a field of view of a depth camera having one or more sensors. The depth camera may have one or more sensors for generating a depth image and may also have an RGB camera. In some embodiments, the field of view is re-oriented based on the depth image. The position of the sensor(s) may be altered to change the field of view automatically based on an analysis of objects in the depth image. The re-orientation process may be repeated until a desired orientation of the sensor is determined. Input from the RGB camera might be used to validate a final orientation of the depth camera, but is not required to during the process of determining new possible orientation of the field of view.

Figure 1A:
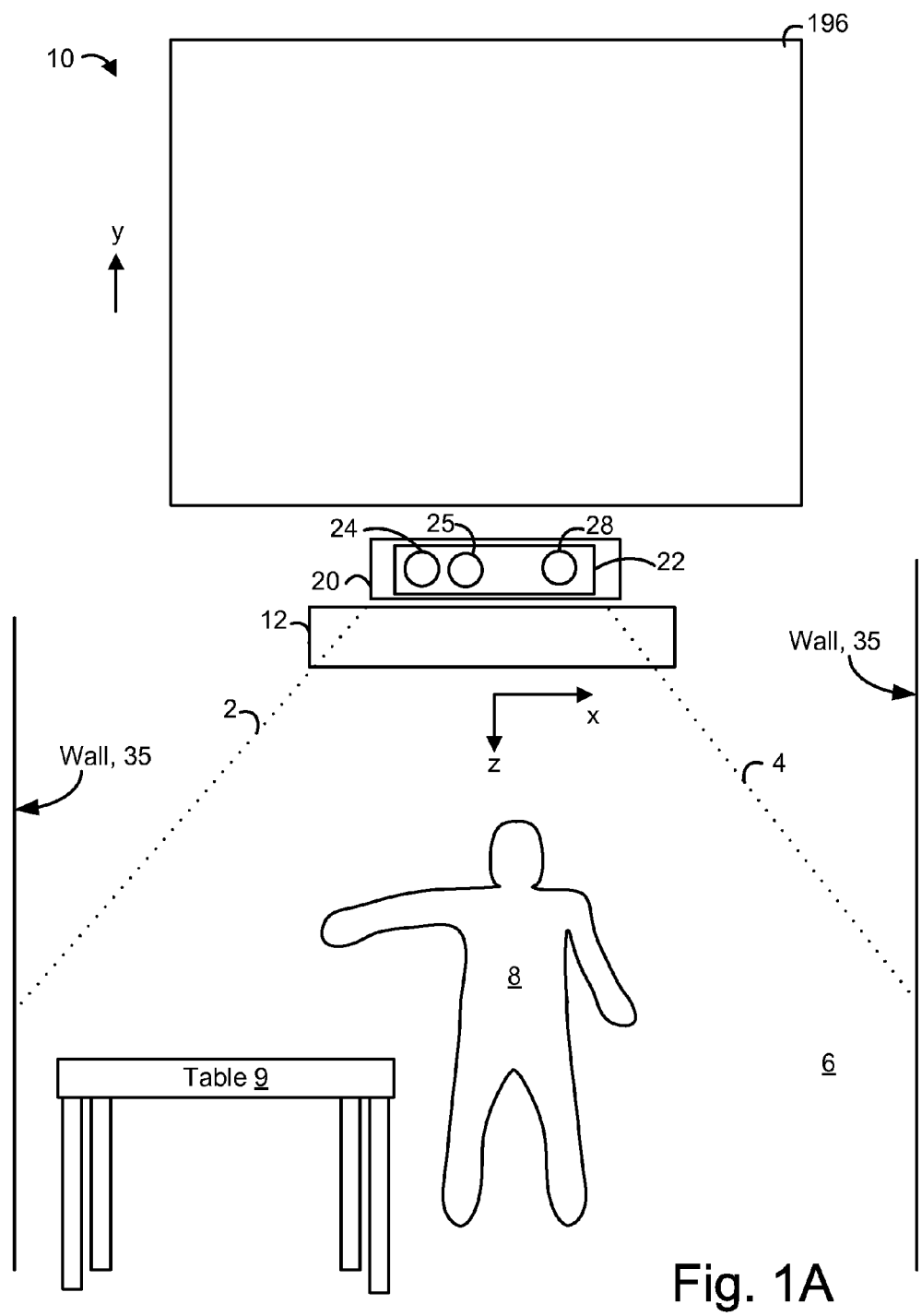
FIG. 1A depicts an example of a motion capture system.

Some embodiments may be practiced within a motion capture system. Therefore, an example motion capture system will be described. However, it will be understood that technology described herein is not limited to a motion capture system. FIG. 1A depicts an example of a motion capture system 10 in which a person in a room (or other environment) interacts with an application. There may be other objects in the room, such as a table 9, lamp, sofa, etc.

The motion capture system 10 includes a display 196, a depth camera system 20, and a computing environment or apparatus 12. The depth camera system 20 may include an image camera component 22 having a light transmitter 24, light sensor 25, and a red-green-blue (RGB) camera 28. In one embodiment, the light transmitter 24 emits a collimated light beam. Examples of collimated light include, but are not limited to, Infrared (IR) and laser. In one embodiment, the light transmitter 24 is an LED. Light that reflects off from the listener 8, objects 9, walls 35, etc. in the field of view 6 is detected by the light sensor 25. Light that is collected by the light sensor 25 may be used to generate a depth image. In some embodiments, the system 10 uses the depth image to determine how to re-orient the depth camera 20.

A user 8 stands in a field of view 6 of the depth camera system 20. Lines 2 and 4 denote a boundary of the field of view 6. A Cartesian world coordinate system may be defined which includes a z-axis, which extends along the focal length of the depth camera system 20, e.g., horizontally, a y-axis, which extends vertically, and an x-axis, which extends laterally and horizontally. Note that the perspective of the drawing is modified as a simplification, as the display 196 extends vertically in the y-axis direction and the z-axis extends out from the depth camera system 20, perpendicular to the y-axis and the x-axis, and parallel to a ground surface on which the user stands.

Because the field of view 6 may be limited, it may be that some of the objects are either only partially in the field of view 6, or completely out of the field of view 6. For example, the user 8 might be partially or completely out of the field of view 6. In some embodiments, the field of view 6 may be adjusted such that objects that are partially or completely out of the field of view 6 can be captured by the depth camera 20. In one embodiment, the depth camera 20 has a motor that allows the light transmitter 24, light sensor 25, and a red-green-blue (RGB) camera 28 to be moved to change the field of view 6.

Note that the depth camera 20 may generate two images: a depth image and an RGB image. The depth image may be generated based on light collected at the light sensor 25. The RGB image may be generated based on light collected at the RGB camera 28. Since each image may be generated from light collected at a different sensor, it is not required that the field of view of each image be exactly the same. It may be that field of view associated with the depth image is wider or more narrow than the field of view associated with the RGB image. However, in some embodiments, the field of view of the depth image and the RGB image may have substantial overlap such that data from the depth image may be correlated to data from the RGB image. In some embodiments, changing the orientation of the field of view of one image also results in a change in the orientation of the field of view of the other image. For example, if the depth camera 20 were to be tilted upward, then the RGB camera 28 and the light sensor 25 may be moved by a similar amount.

Generally, the motion capture system 10 is used to recognize, analyze, and/or track an object. The computing environment 12 can include a computer, a gaming system or console, or the like, as well as hardware components and/or software components to execute applications.

The motion capture system 10 may be connected to an audiovisual device such as the display 196, e.g., a television, a monitor, a high-definition television (HDTV), or the like, or even a projection on a wall or other surface, that provides a visual and audio output to the user. An audio output can also be provided via a separate device. To drive the display, the computing environment 12 may include a video adapter such as a graphics card and/or an audio adapter such as a sound card that provides audiovisual signals associated with an application. The display 196 may be connected to the computing environment 12 via, for example, an S-Video cable, a coaxial cable, an HDMI cable, a DVI cable, a VGA cable, or the like.

Figure 1B:
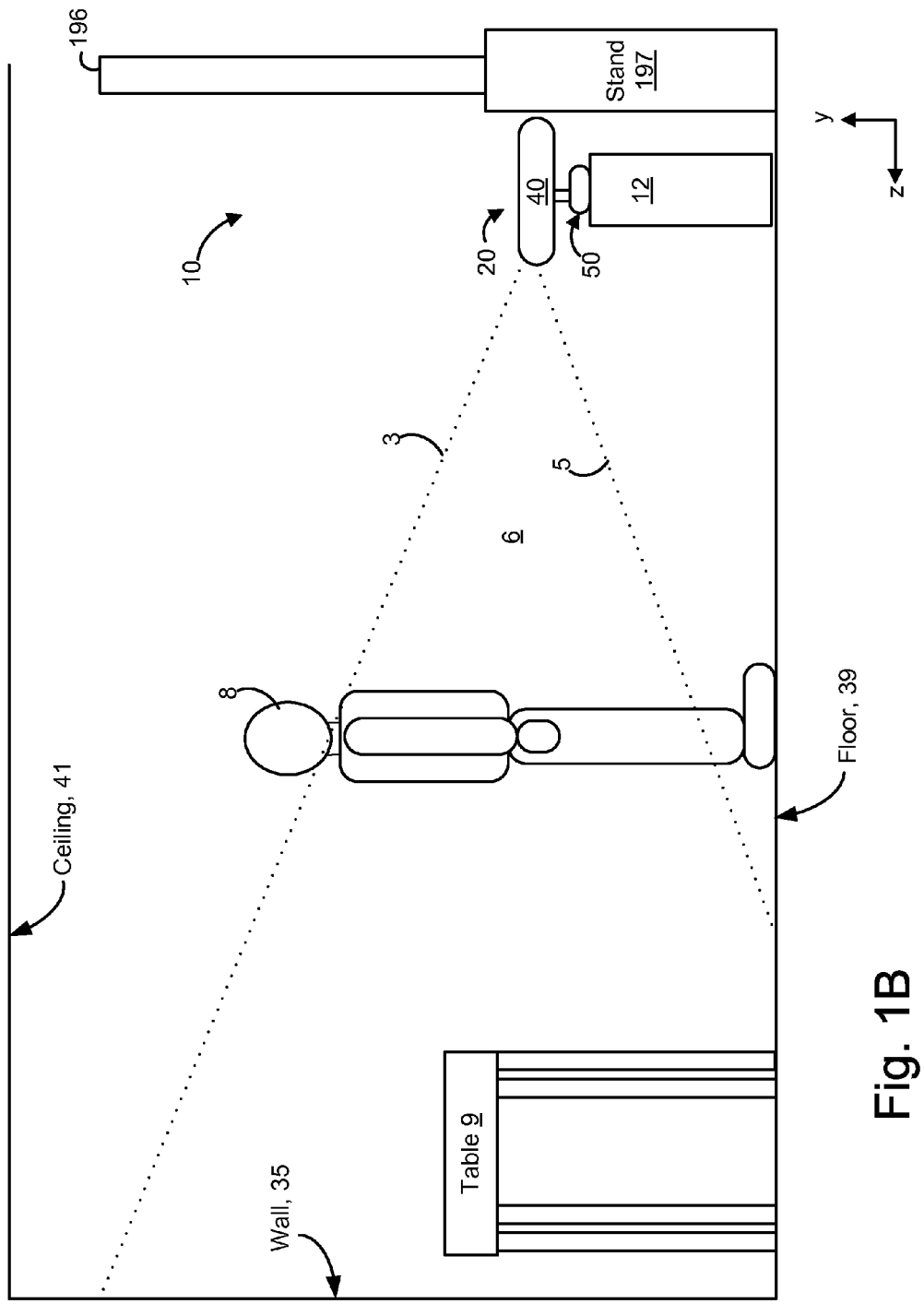
FIG. 1B depicts an example of a motion capture system from a side view.

FIG. 1B depicts a side view of an example motion capture system 10 in an environment such as a room. The field of view 6 of the depth camera system 20 is defined by lines 3 and 5. The user 8 is partially within the field of view 6. The depth camera system 20 may be tilted up to capture the user's head within the field of view 6. For a smaller user (not depicted in FIG. 1B), the depth camera system 20 might be titled down to capture more of the user's lower body, while still capturing the user's head. The depth camera system 20 is presently at an angle that allows part of the floor 39 to be captured; however, none of the ceiling 41 is captured. The depth camera system 20 could be tilted up or down to capture more of either the floor 39 or ceiling 41. In this example, the display 196 rests on a stand 197. The depth camera system 20 has a base 50 and main body 40. The base 50 rests on the computing environment 12, in this example. However, the base 50 might be placed on any surface.

FIG. 2A depicts an example block diagram of the motion capture system 10 of FIG. 1A or 1B. The system 10 includes a depth camera system 20 and a computing environment 12. The computing environment 12 inputs depth information and RGB information from the depth camera system 20 and may output a sensor signal. Note that hardware executed implementations, as well as mixed software/hardware implementations, are also possible.

The depth camera system 20 may be configured to generate a depth image that may include depth values. The depth camera system 20 may organize the depth image into "Z layers," or layers that may be perpendicular to a Z-axis extending from the depth camera system 20 along its line of sight. The depth image may include a two-dimensional (2-D) pixel area of the captured scene, where each pixel in the 2-D pixel area has an associated depth value which represents either a linear distance from the image camera component 22 (radial distance) or the Z component of the 3D location viewed by the pixel (perpendicular distance).

The image camera component 22 may include a light transmitter 24 and one or more light sensors 25 to capture intensity of light that reflect off from objects in the field of view. For example, depth camera system 20 may use the light transmitter 24 to emit light onto the physical space and use light sensor 25 to detect the reflected light from the surface of one or more objects in the physical space. In some embodiments, depth values are determined based on the intensity of light. For example, over time more and more photons reach a given pixel. After a collection period, the intensity of light at each pixel is sampled. The depth values in the depth image may be determined based on the intensity of light at each pixel. In some embodiments, the light transmitter 24 transmits pulsed infrared light. In some embodiments, the light is modulated at desired frequency.

The red-green-blue (RGB) camera 28 may be used to capture a visible light image. The depth camera system 20 may further include one or more microphones 30, which includes, e.g., a transducer or sensor that receives and converts sound waves into an electrical signal. Additionally, the microphone 30 may be used to receive audio signals such as sounds that are provided by a person to control an application that is run by the computing environment 12. The audio signals can include vocal sounds of the person such as spoken words, whistling, shouts and other utterances as well as non-vocal sounds such as clapping hands or stomping feet. In some embodiments, the microphone 30 is a microphone array, which may have any number of microphones running together.

The depth camera system 20 may include logic 31 coupled to the image camera component 22. In this embodiment, the logic 31 includes a processor 32 that is in communication with the image camera component 22. The processor 32 may include a standardized processor, a specialized processor, a microprocessor, or the like that may execute instructions including, for example, instructions for generating a sensor signal.

The depth camera system 20 may further include a memory component 34 that may store instructions that are executed by the processor 32, as well as storing images or frames of images captured by the RGB camera, or any other suitable information, images, or the like. According to an example embodiment, the memory component 34 may include random access memory (RAM), read only memory (ROM), cache, flash memory, a hard disk, or any other suitable tangible computer readable storage component. The memory component 34 may be a separate component in communication with the image capture component 22 and the processor 32 via a bus 21. According to another embodiment, the memory component 34 may be integrated into the processor 32 and/or the image capture component 22.

The depth camera system 20 may be in communication with the computing environment 12 via a communication link 36. The communication link 36 may be a wired and/or a wireless connection. According to one embodiment, the computing environment 12 may provide a clock signal to the depth camera system 20 via the communication link 36 that indicates when to capture image data from the physical space which is in the field of view of the depth camera system 20.

Additionally, the depth camera system 20 may provide the depth information and images captured by the RGB camera 28 to the computing environment 12 via the communication link 36. The computing environment 12 may then use the depth information, and captured images to control an application. For example, as shown in FIG. 2A or 2B, the computing environment 12 may include a gestures library 190, such as a collection of gesture filters, each having information concerning a gesture that may be performed (as the user moves). For example, a gesture filter can be provided for various hand gestures, such as swiping or flinging of the hands. By comparing a detected motion to each filter, a specified gesture or movement that is performed by a person can be identified. An extent to which the movement is performed can also be determined.

The computing environment may also include a processor 192 for executing instructions, which are stored in a memory 194 to provide audio-video output signals to the display device 196 and to achieve other functionality.

FIG. 2B depicts an example block diagram of the motion capture system 10 of FIG. 1A or 1B. The system 10 includes a depth camera system 20 and a computing environment 12.

In this embodiment, the logic 31 coupled to the image capture component 22 includes circuitry 35. The circuitry 35 may be considered to be a hardware implementation. The circuitry 35 may perform similar tasks as the processor 32 of the embodiment of FIG. 2A. Note that in some embodiments the logic 31 is a mixed hardware/software implementation.

Figure 3:
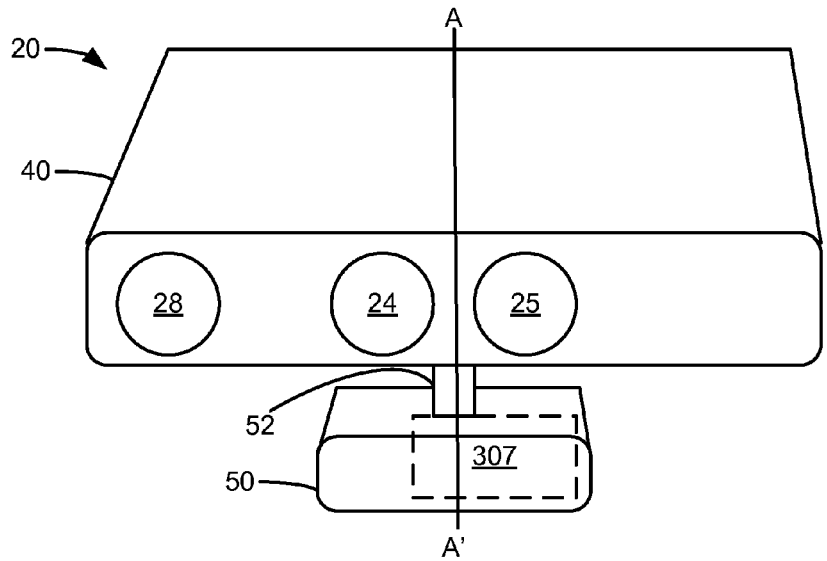
FIG. 3 is a perspective view of one embodiment of a depth camera system.

FIG. 3 is a perspective view of one embodiment of a depth camera system 20. In this embodiment, the depth camera system 20 has a main body 40 that is connected to a base 50 by an arm 52. The base 50 may contain a motor 307 that is able to move the position of the arm 52 in order to move the orientation of the main body 40. Therefore, the orientation of the sensors (e.g., light collector 25, RGB camera 28) may be adjusted. Note that the orientation of the light transmitter 24 may also be adjusted in unison with the sensors. The bottom of the arm 52 may be connected to the motor 307 such that the arm 52 may be moved by the motor 307. The top of the arm 52 may be fixed to the main body 40.

Figure 4A:
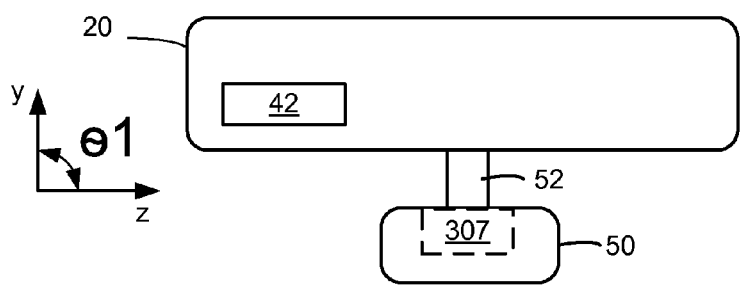
FIGS. 4A-4C depict side sectional views of the depth camera system of FIG. 3, taken along line A-A'.
Figure 4B:
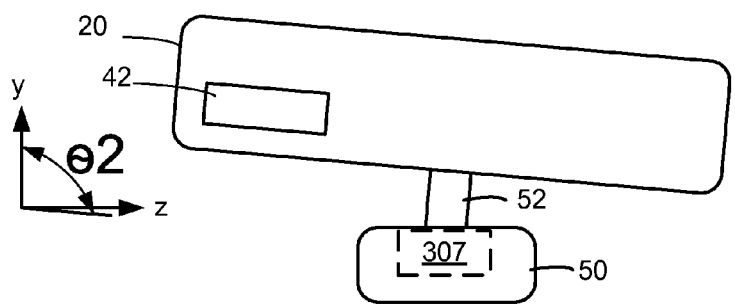
Figure 4C:
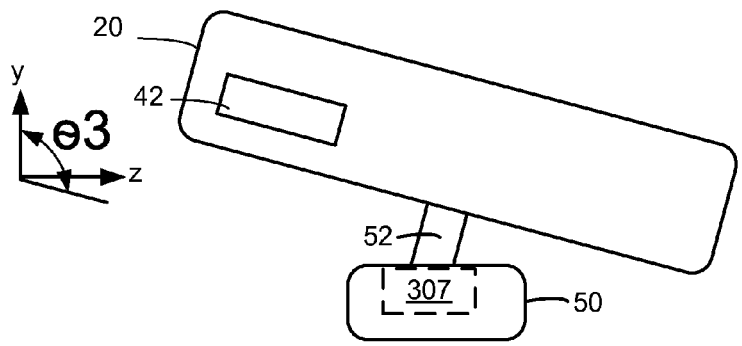

FIGS. 4A-4C depict side sectional views of the depth camera system 20 of FIG. 3, taken along line A-A'. FIGS. 4A-4C show that the main body 40 may be tilted relative to the y-z axis such that the sensors' field of view may be adjusted. Several angles $\theta 1$, $\theta 2$, and $\theta 3$ with respect to the y-z axis are depicted in FIGS. 4A-4C respectively.

The main body 40 may have an accelerometer 42 to allow the position of the main body 40 relative to the y-z axis to be determined. For example, the accelerometer 42 may allow the angle $\theta$ to be determined. In some embodiments, one or more of the sensors is used to determine the position of the floor to assist in determining the position of the main body 40. If the floor is not visible due to the orientation of the main body 40, the orientation of the main body 40 may be determined based an accelerometer readings.

Figure 5A:
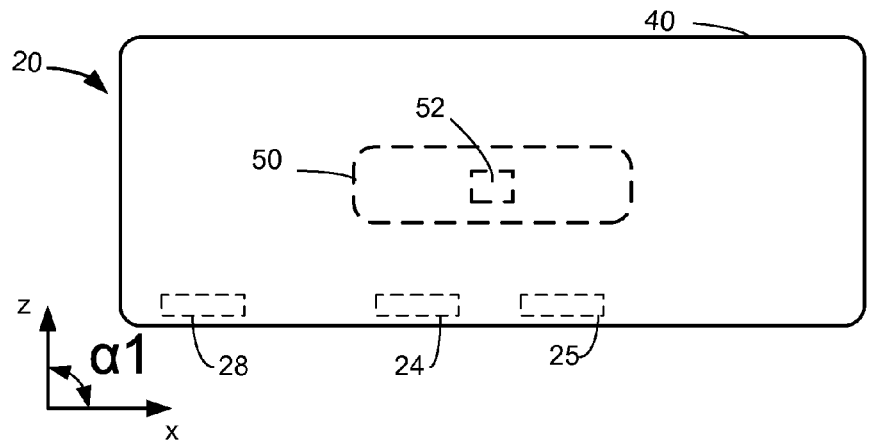
FIGS. 5A-5C show three example angles at which the main body of a depth camera might be positioned.
Figure 5B:
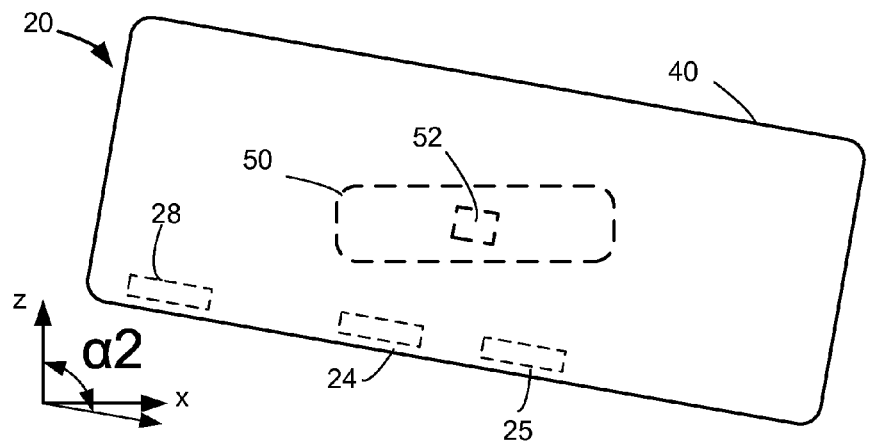
Figure 5C:
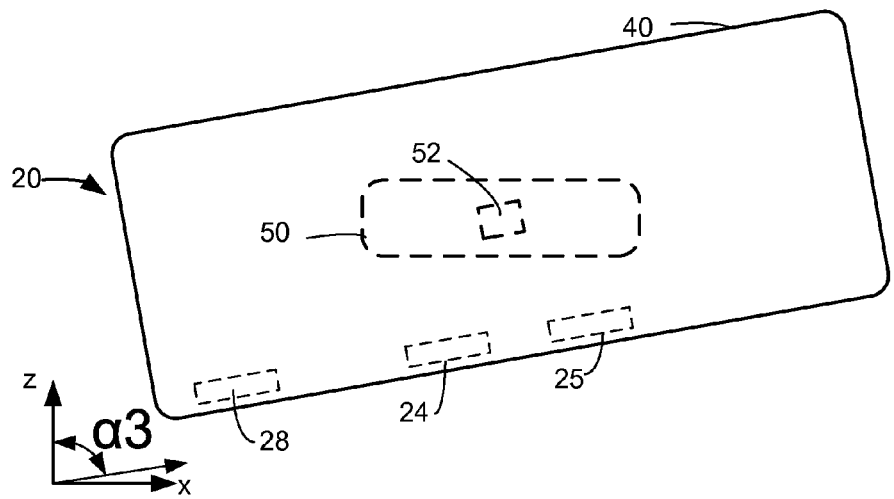

FIGS. 4A-4C showed how the main body 40 could be titled up and down relative to the y-z axis (note that this may be the same y-z axis depicted in FIG. 1A or 1B). The main body 40 could also be titled relative to the z-x axis of FIG. 1A. From the perspective of a user in the room, this may allow moving the sensors 25, 28 to the left or right. FIGS. 5A-5C show top views of the depth camera system 20 of FIG. 3. FIGS. 5A-5C show three example angles at which the main body 40 might be positioned in order to orient the sensors 25, 28 to move the field of view relative to the z-x axis.

In FIGS. 5A-5C the top view shows the main body 40 in solid lines. Dashed lines are used to represent the light transmitter 24, light sensor 25, and red-green-blue (RGB) camera 28 in the main body 40. Dashed lines are also used to represent the base 50 and arm 52. The motor in the base 50 may be used to rotate the arm 52 in order to move the main body relative to the z-x axis. Several angles $\alpha 1$, $\alpha 2$, and $\alpha 3$ with respect to the z-x axis are depicted in FIGS. 5A-5C respectively.

Figure 6A:
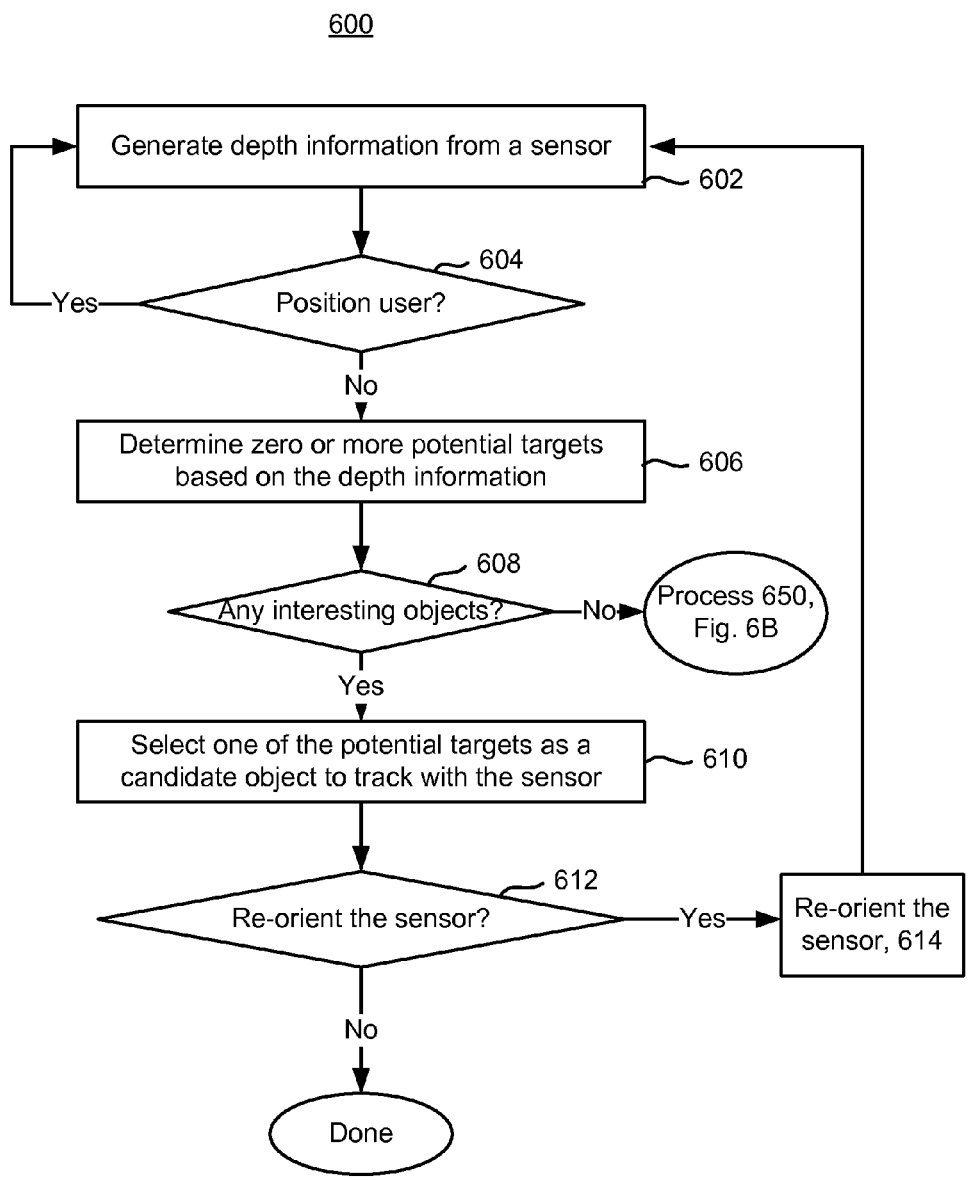
FIG. 6A is a flowchart of one embodiment of a process of orienting a sensor.

FIG. 6A is a flowchart of one embodiment of a process 600 of orienting one or more sensors to track a user 8. The process 600 may be implemented by the motion capture system 10, but another device may be used. At least some steps of process 600 may be performed by the logic 31 in the depth camera 20. As an alternative, process 600 may be performed by the computing environment 12. The process 600 may be used to move the position of the depth camera system 20 and/or the image camera component 22 in order to orient the sensor or sensors (e.g., light sensor 25, and RGB camera 28). A light transmitter 24 that works in connection with the light sensor 25 may also be oriented during process 600. For purposes of discussion, an example will be described herein in which sensors 25 and 28 are oriented. However, it will be understood that in some embodiments, only a single sensor (e.g., a depth sensor such as light sensor 25) is oriented.

Process 600 might be used to tilt the main body 40 of the depth camera 20 with respect to the y-z axis, as shown in FIGS. 4A-4C to find a desired position for tracking a user. The process 600 could also be used to tilt the main body 40 with respect to the z-x axis, as shown in FIGS. 5A-5C to find a desired position for tracking a user. The process 600 could be used to orient the sensors 25, 28 in with respect to other axes.

In step 602, depth information is generated from a sensor. For example, the depth camera system 20 is used to generate depth information based on light transmitted by light transmitter 24 and light collected by light sensor 25. The depth information may include a depth image. One embodiment of step 602 will be described in more detail below in connection with FIG. 7.

One option during process 600 is to instruct the user 8 where to stand while process 600 is ongoing. In step 604, a potential user may be asked to position themselves in a particular location in the room. In one embodiment, an application with which the user 8 is about to interact suggests a location to the user 8. This application may make this suggestion based on a model of the room that is developed based on the sensor data collected in step 602. Note that it is not required that the user 8 be asked to move to some location in the room. If the user 8 is instructed to move to a new location, then process 600 may return to step 602 to collect more sensor data. Further details of one embodiment of step 604 will be described below in connection with FIG. 10.

In step 606, zero or more potential targets are determined based on the depth image. In one embodiment, the depth information is analyzed to determine possible objects in the room. Some objects might be of more interest than others. For example, if an object is likely to be a table or lamp, then it may not be of interest for tracking. However, if an object is at least somewhat likely to be a user 8, then it might be of more interest to track. Note that the object of interest might only be partially within the field of view. Also note that the determination made in step 606 may be made based on depth information without the use of RGB information, in one embodiment. One embodiment of step 606 will be described in more detail below in connection with FIG. 8.

In step 608, a determination is made whether any interesting objects were detected in step 604. If step 608 did not locate any potential targets, then process 650 of FIG. 6B may be performed.

In the case that one or more potential targets were found, process 600 continues on to step 610 in which one of the potential targets is selected as a candidate target to track. In one embodiment, this selection is based on suggestions or hints from an application with which the user 8 might interact. One factor that may be used to select the candidate target is to analyze characteristics of the objects of interest, such as height, width, depth, position relative to floor, etc.

In step 612, a determination is made as to whether the sensors 25, 28 should be re-oriented. This determination may be made based on whether the target candidate is properly within the field of view of the light sensor 25. Thus, the determination may be based on the present orientation of the light sensor 25 and/or RGB camera 28 and a position of the candidate object in the field of view. In one embodiment, this determination is based on a request from an application that the user 8 interacts with based on sensor input. As one example the application could be a game that the user controls based on the sensor detecting the user's movements. The application might request that the sensors 25, 28 be positioned in a way that puts the user 8 into a certain position in the field of view. If the determination is that the sensors 25, 28 should be re-oriented, then step 614 is performed.

Note that the determination of whether the sensors 25, 28 should be re-oriented may also be based how the sensors 25, 28 capture the room. For example, in some cases, the user 8 might completely fit within the field of view 6, but the user's surroundings are not adequately within the field of view 6. In such a case, the sensors 25, 28 could be re-oriented to better capture the user's surroundings without sacrificing capturing the user 8.

In step 614, sensors 25, 28 are re-oriented. The light sensor 25 may be re-oriented in an attempt to better track the candidate object. For example, if the candidate object is not fully in the field of view, then the light sensor 25 may be moved in an attempt to place more of the candidate object in the field of view. In some cases, it may be desirable to place a particular part of the candidate object in the field of view. For example, it might be desirable to place the head, hands, or other body parts in the field of view. As noted above, in some cases, the sensors 25, 28 are re-oriented to better capture the user's surroundings without sacrificing capturing the user 8. Further details of step 614 will be described in more detail below in connection with FIG. 11. After moving the sensors 25, 28, process 600 may return to step 602 to generate more depth information. The process 600 may repeat steps of determining potential targets, and selecting a candidate target.

Eventually, a determination may be made in step 612 that the sensors 25, 28 are properly oriented. In that case, the process 600 may end. However, if desired, an optional confirmation of that the final candidate object is a user 8 may be performed. Optionally, the sensor position 25, 28 may be validated by the use of biometric information. For example, RGB data, along with possibly depth values, may be used to determine whether the candidate target is recognized as a human. For example, facial recognition might be used as the biometric information.

Figure 6B:
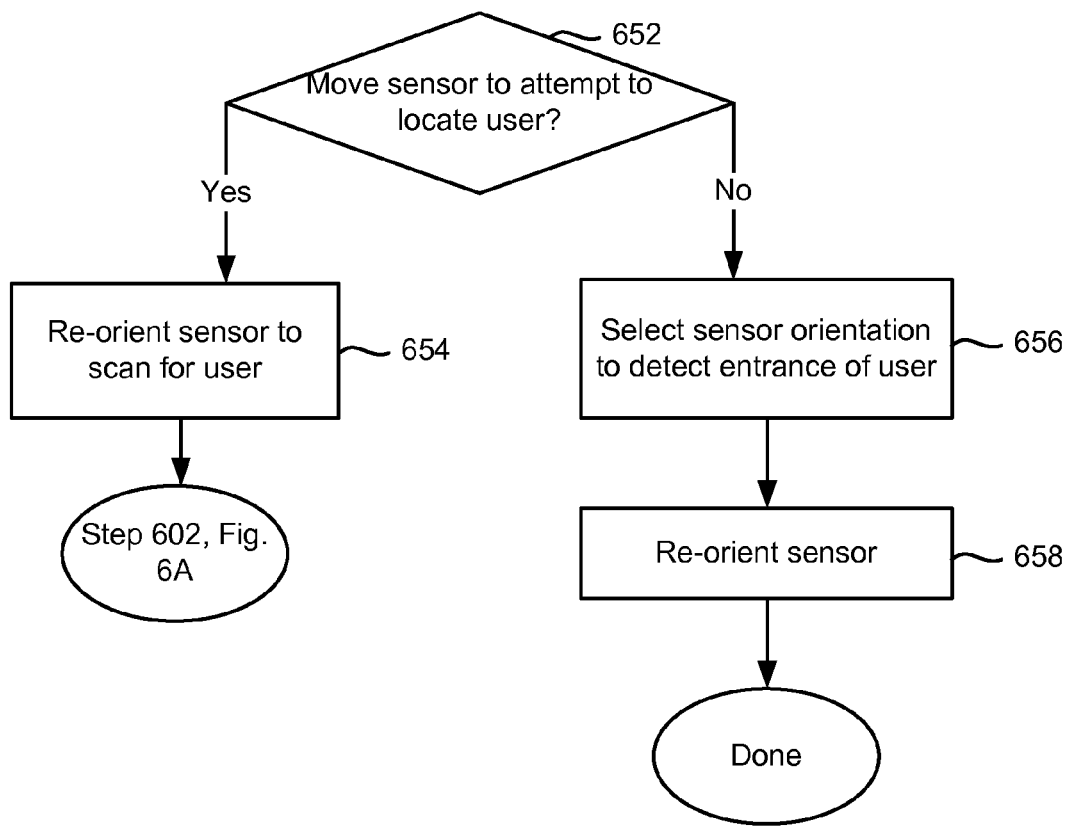
FIG. 6B is a flowchart of one embodiment of a process of orienting a sensor when no potential targets are found.

FIG. 6B is a flowchart of one embodiment of a process 650 of orienting sensors when no interesting objects are found in a depth image. Process 650 may be performed if step 608 of process 600 makes such a determination. Process 650 may be performed by the logic 31 in the depth camera 20. As an alternative, process 650 may be performed by the computing environment 12. In step 652, a determination is made whether to re-orient the light sensor 25 to attempt to locate an interesting object at the present time. For example, it may be that there is a user 8 in the room, but that the sensor's field of view did not pick up the user 8. It may also be that only a portion of the user 8 was in the field of view, and this did not provide enough information to determine that an object in a depth image corresponding to the portion of the user was interesting. Thus, one option is to re-orient the sensors 25, 28 in step 654. The field of view of the light sensor 25 may be altered to scan for an interesting object. That is, the field of view of the light sensor 25 might be moved to capture data for a part of the room that has not yet been captured. Then, step 602 of FIG. 6B may be performed to generate depth information with the new sensor position.

On the other hand, it may also be that the light sensor 25 has already scanned the room adequately and no user 8 was detected. It might be that for some sensor positions that some interesting objects were detected, but that upon further evaluation those interesting objects were determined to no longer be interesting. In this case, the light sensor 25 may be positioned in a way to attempt to best capture a user 8 that might come into the field of view later. Thus, in step 656, a determination is made of a sensor orientation that is suitable to detect a user 8 if a user were to enter the room later. The determination of the suitable sensor orientation may be based on knowledge of the room that was determined during process 600, such as a 3D room model. For example, based on location of furniture and a game system, a determination may be made as to where a user 8 might stand. In step 658, the sensors 25, 28 are re-oriented based on the determination of step 656. Then, the process 650 ends.

Figure 7:
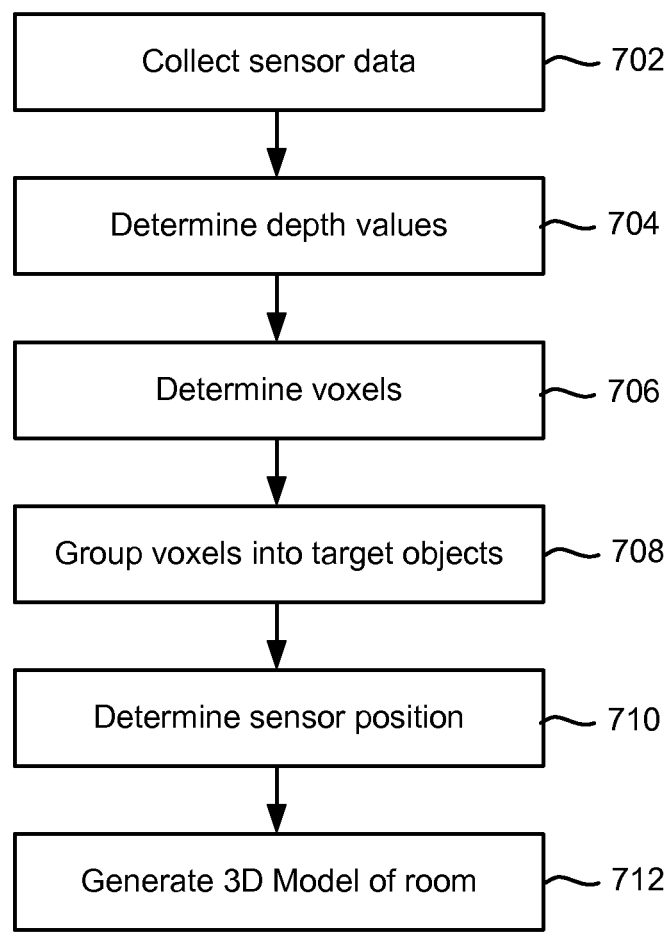
FIG. 7 is a flowchart of one embodiment of a process of generating depth information.

FIG. 7 is a flowchart of one embodiment of a process 700 of generating depth information. Process 700 is one embodiment of step 602 of process 600. Process 700 may be performed by the logic 31 in the depth camera 20. As an alternative, process 700 may be performed by the computing environment 12. In step 702, sensor data is collected. In one embodiment, the light transmitter 24 and light sensor 25 are used in step 702. However, the RGB camera 28 is not required in step 702. For example, light transmitted may be used to transmit a pulsed IR beam. Light sensor 25 may be used to detect IR light that reflect off from objects in the field of view. The light sensor 25 could include a CMOS or other type of sensor. The light sensor 25 may produce light intensity values from which depth values may be determined. For example, the light sensor 25 could have an array of 320×240 pixels, with each pixel generating a light intensity value due to detecting the reflection of the IR beam over a period of time. Note that step 702 may involve making more than one light intensity reading. For example, a first pulsed IR beam may be transmitted for a first period of time to collect a first set of light intensity values. Then, a second pulsed IR beam may be transmitted for a second period of time to collect a second set of light intensity values.

In step 704, depth values are generated from the sensor data that was collected in step 702. In one embodiment, a depth value may be produced for each pixel in the sensor based on the light intensity value for each of the two reading mentioned in step 702. Each pixel may represent some 2D-region in the field of view. A depth value may define the distance from the depth camera 20 to an object in the corresponding region in the field of view. The depth value may form a depth image. For example, the depth image may include a 2-D pixel area of the captured scene where each pixel may have an X-value, a Y-value, and a depth value (or Z-value) associated therewith.

In step 706, voxels are determined based on the depth values. A voxel may be considered to be a 3D pixel. Thus, a voxel may be defined to be a volumetric pixel. In other words, each voxel may represent some 3D-region of the field of view. In one embodiment, a voxel may be generated based on depth values for one or more pixels in the depth image. The position of the voxel in 3D space may be determined based on the depth value of a pixel in the depth image. In one embodiment, the depth image is down-sampled such that a voxel represents more than one pixel of the depth image. In this case, the value for the voxel (e.g., its position in 3D space) may represent the average, maximum, minimum, and/or median depth values for the portion of the depth image that the voxel represents.

In step 708, voxels are grouped into target objects. For example, each voxel may be analyzed to determine what other voxels are likely to form part of the same object. For example, the room might contain a floor, walls, table, chair, lamp, and user 8. For some of these objects only a portion of the object may be in the field of view. In step 708, voxels that might form the floor may be grouped together; voxels that might form the user (or visible portion) are grouped together, etc. It is not required at this point that any determination be made as to what each object is.

To determine which object a voxel may be associated with, the system 10 may compare the value of each voxel with its neighbor to look for voxels having similar values. Note that the depth values from the depth image may be used, if desired.

For example, in one embodiment, the average depth value associated with a particular voxel being analyzed may be compared to the average depth values of each voxel that may be adjacent to the particular voxel being analyzed. If the difference between the average depth value of the particular voxel being analyzed and an average depth value of an adjacent voxel may be less than a threshold, the particular voxel and the adjacent voxel may be identified as belonging to the same object. If the difference between the average depth value of the particular voxel being analyzed and an average depth value of an adjacent voxel may be greater than the threshold, the particular voxel and the adjacent voxel may be identified as belonging to separate objects. According to an example embodiment, the threshold may be a predetermined value that may be based on a likelihood or probability that voxels may be part of the same object.

In step 710, one or more sensor 25, 28 positions are determined. The position of the sensors 25, 28 may be specified in terms of a distance from the floor, and one or more angles of the depth camera 20. In one embodiment, the sensor position is determined by first determining the position of the floor. However, in some cases, the sensors 25, 28 may be tilted such that the floor is not presently in the field of view. In such a case, the sensor position might be determined based on previous data (or newly acquired data) in which the floor was visible and data readings from the accelerometer 42. Further details are discussed in connection with FIG. 12.

In step 712, a 3D model of the room is constructed based on the depth information and the knowledge of the sensor position. Note that as the sensors 25, 28 is re-oriented, a given pixel in the depth map will correspond to a different location in the 3D model of the room. Likewise, for voxels. Therefore, a translation may be made in step 712 to account for the present position of the sensors 25, 28.

Figure 8:
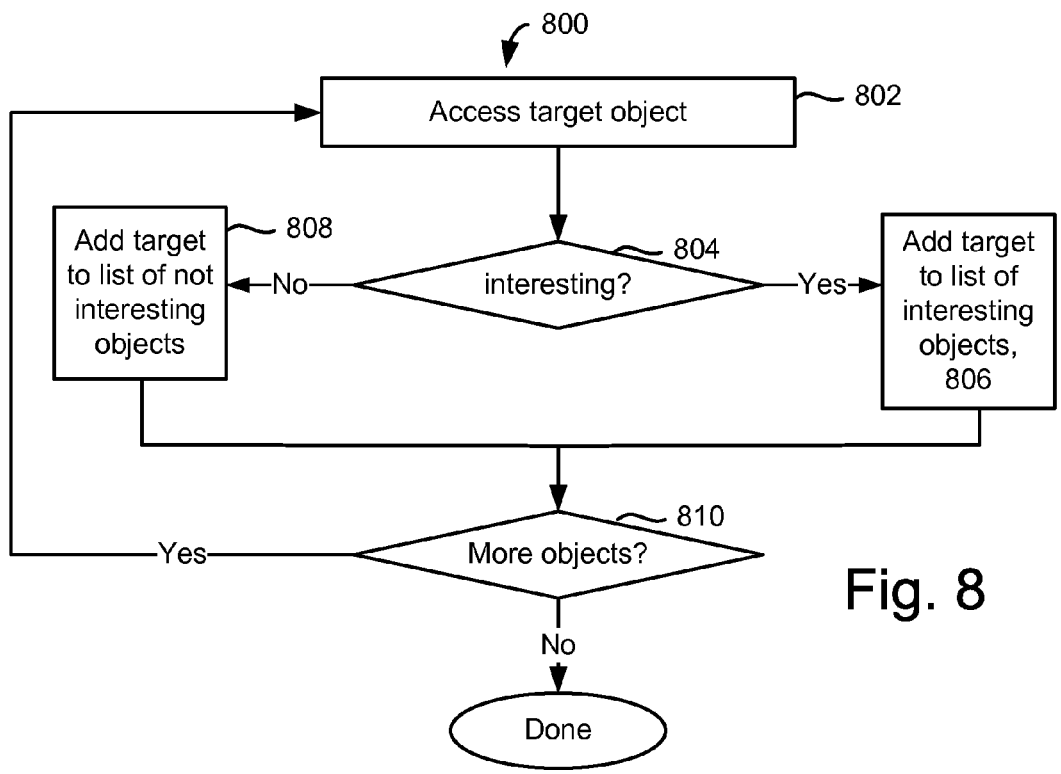
FIG. 8 is a flowchart of one embodiment of a process of determining potential targets to be tracked.

FIG. 8 is a flowchart of one embodiment of a process 800 of determining potential targets to be tracked. Process 800 is one embodiment of step 606 of process 600. In one embodiment, the objects that were determined in step 708 of process 700 based on voxels are each analyzed during process 800 to determine which of the objects might be an interesting candidate to track. Process 800 may be performed by the logic 31 in the depth camera 20. As an alternative, process 800 may be performed by the computing environment 12.

Process 800 begins by accessing a target object in step 802. For example, one of the objects from step 708 is accessed. In step 804, a determination is made whether the object is interesting to track. If the object is considered interesting, it is placed on a list of interesting objects in step 806. Note that later a candidate object to track may be selected from this list of interesting objects. Note that this list may contain objects that later turn out to be not very interesting. For example, initially an object might be determined to possibly be a user and is thus placed on the list of interesting objects. However, after the sensor is re-oriented and additional sensor data is collected, it might be determined that the object is not a user. Thus, note that the list might be over-inclusive, at least initially.

If the object is considered to be not interesting, then it may be placed on a list of objects that are not interesting objects to track in step 808. Examples object that are not interested may include an object determined to be the floor, a wall, or a piece of furniture.

In one embodiment, the determination of whether an object is interesting is made based on factors such as size, shape, and location of the object. For example, the width and/or height of the object may suggest that it might be a user.

If there are more objects to be considered (step 810 is yes), the process 800 returns to step 802 to access the next object. After all objects have been analyzed, the process 800 may end without further action.

Figure 9:
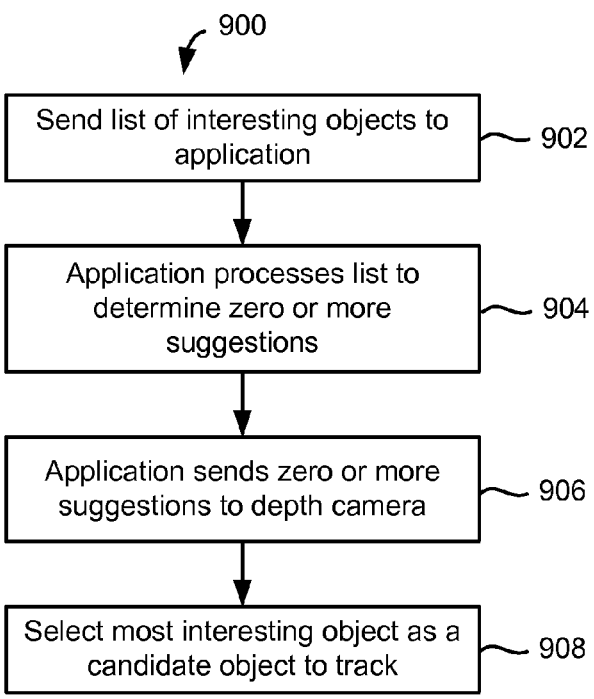
FIG. 9 is a flowchart of one embodiment of a process of selecting a candidate object.

FIG. 9 is a flowchart of one embodiment of a process 900 of selecting one of the interesting (or potential) objects as a candidate object. Process 900 is one embodiment of step 610 of process 900. In one embodiment, some steps of process 900 are performed by the logic 31 in the depth camera system 20. Other steps of process 900 may be performed by an application with which a user may interact. The application may run, for example, on the processor 192 in the computing environment 12. In one embodiment, all steps of process 900 run in computing environment 12.

In step 902, a list of interesting objects is sent to the application. For example, the list of interesting objects that were determined in process 800 is sent from logic 31 in the depth camera 20 to an application running on processor 192 in the computing environment 12. Instead of sending the list from the logic 31, it could be sent from an application running on computing environment 12. The application might also be sent a list of objects that were determined to not be interesting. The application may also be sent depth information, such as the depth information that was determined in process 700. This could include one or more of a 3D model of the room, voxels, and a depth map.

In step 904, the application processes the information to determine zero or more suggestions of which of the objects are likely candidates/not candidates of being a user 8. For example, the application might determine which objects should be ignored and which should be given greater consideration. Note that the application might suggest that an object from the list of non-interesting objects be considered as a candidate to track.

In step 906, the application sends zero or more suggestions to the depth camera 20. In step 908, the depth camera 20 selects one of the objects as a candidate object. This may be based on a hint or suggestion from the application, if the application provides such information. Given that the list of interesting objects may have been reduced based on suggestions from the application, there may be relatively few objects to select from as candidates. If there are more than one objects left to choose from the depth camera may select the candidate object in a variety of ways. One way to determine a score for each remaining object based on similar factors that were used to generate the initial list of interesting objects. The object with the highest score may be selected as the candidate. Other objects can be remembered, such that they might be selected as candidate objects later. For example, if it turns out that the candidate that was selected this time is not a user, then a different object can be selected the next time.

Figure 10:
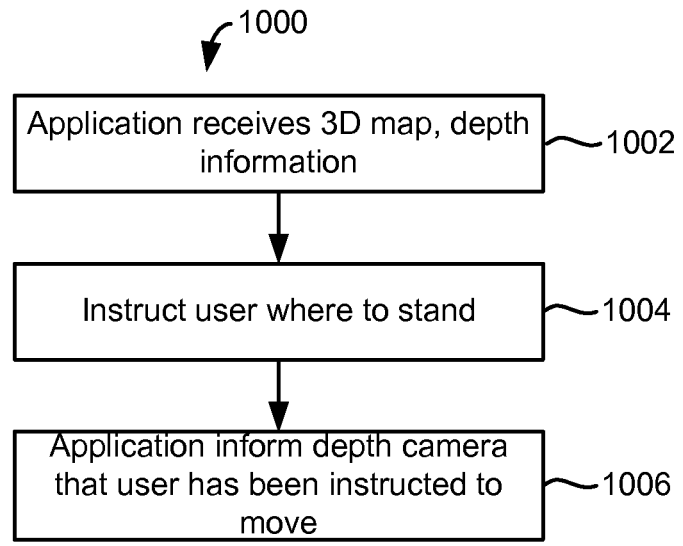
FIG. 10 is a flowchart of one embodiment of a process of instructing a user to move to a new location while a sensor is being oriented.

In one embodiment, a user is instructed to move to a certain location during a process of orienting the sensor. The user might be asked to move even prior to re-orienting the sensor to better track a candidate object. For example, in process 600 after generating depth information (step 602), a user could be asked to move to a new location in the room. In this case, rather than re-orienting the sensor, process 600 could return to step 602 to collect more sensor data after the user has moved. FIG. 10 is a flowchart of one embodiment of a process 1000 of instructing a user to move to a new location while a sensor is being oriented. Process 1000 is one embodiment of step 604 of process 600. Process 1000 may be performed by an application running of the processor 192 in computing environment 12. Prior to process 1000, sensor data has been collected for the present physical position of the sensors 25, 28. A process such as process 700 may have been performed to generate a 3D model of the room. Note that the 3D model of the room may be built up based on more than one iteration of process 600. In step 1002, an application receives the 3D model of the room, as well as depth information. The depth information could include a depth image that includes depth values. The depth information could include voxels. The voxels could be grouped in order to represent possible objects in the room In step 1004, the application instructs the user where to stand in the room. This location may be a better position for the sensors to be able to track the user. For example, the application may be aware that a user should be in a zone that is a certain range of distances from the depth camera. The zone may also have a certain width. Since a 3D model of the room was sent to the application, the application can display a map of the room on the display 196 with the zone highlighted.

In step 1006, the application sends a message to the depth camera 20 to indicate that the user was instructed to move. Therefore, the depth camera 20 knows that it may be better to collect more depth information without re-orienting the sensors 25, 28 rather than attempting to select a candidate object at this time. For example, referring back to FIG. 6, step 602 could be performed again rather than going on to perform step 606.

Figure 11:
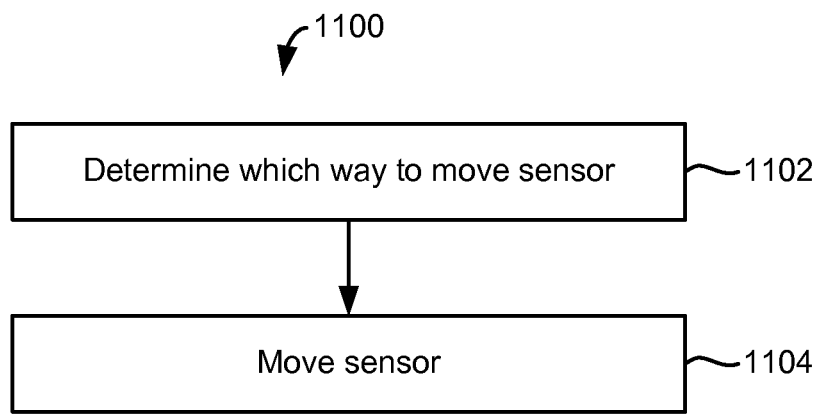
FIG. 11 is a flowchart of one embodiment of a process of orienting the sensor to better track a candidate object.

FIG. 11 is a flowchart of one embodiment of a process 1100 of orienting the sensors 25, 28. This may allow the sensors 25, 28 to better track a candidate object. Process 1100 is one embodiment of step 614 of process 600. Process 1100 may be performed by logic 31 in the depth camera 20 or other logic such as software in the computing environment 12. In step 1102, a determination is made as to which way the sensors 25, 28 should be moved. The sensors 25, 28 may be moved to better frame what is believed to possibly be a user 8 into the field of view. For example, if the candidate object seems to be a user 8, but their head is not in the field of view, then a calculation may be made as to how far to tilt the depth camera 20 up in order to capture the user's head. On the other hand, the candidate object might be suspected to be a user of low stature, such as a child. In this event, the sensors 25, 28 might presently be capturing what is suspected to be a head, but is not capturing hands or arms. In this case, a calculation may be made to tilt the depth camera 20 down.

In step 1104, the sensors 25, 28 are moved based on the determination made in step 1102. In one embodiment, a control signal is sent to a motor 307 in order to tilt and/or rotate a main body 40 of the depth camera 20.

Figure 12:
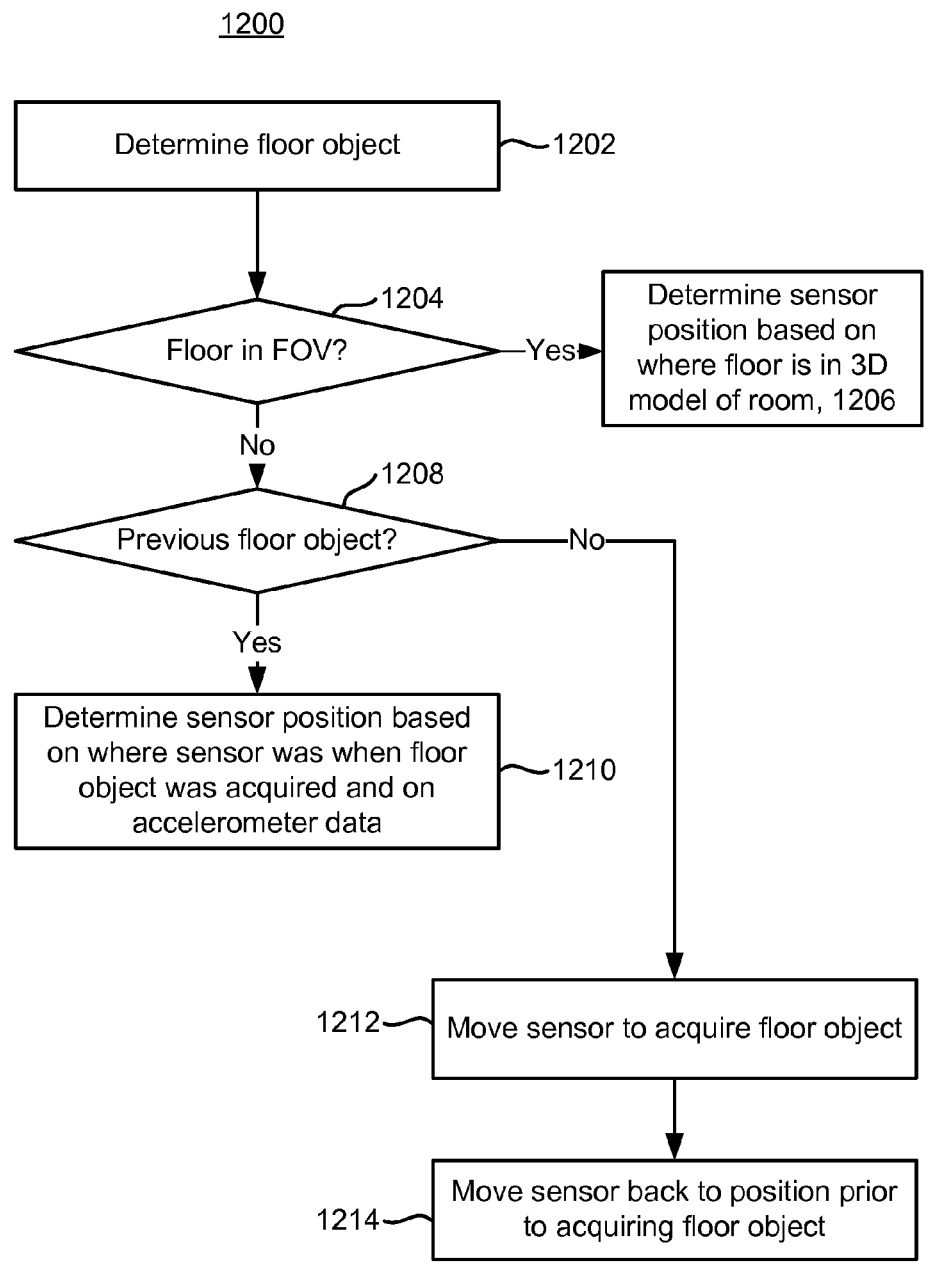
FIG. 12 is a flowchart of one embodiment of a process of determining a position of the sensor.

FIG. 12 is a flowchart of one embodiment of a process 1200 of determining a position of the sensor. Process 1200 is one embodiment of step 710 of process 700. Process 1200 may be performed by logic 31 in the depth camera 20 or other logic such as software in the computing environment 12. Process 1200 may be performed after having just acquired new depth information using the light sensor 25.

In step 1202, an attempt to determine a "floor object" is made. In other words, the position of the floor is determined. As noted above, in some embodiments, various objects may be determined based on voxels (and/or depth values in a depth image). For example, voxels may be grouped together based on properties such as their position in 3D space. A floor object may be determined based on expected location and shape of a floor relative to other objects.

In some cases, the sensors 25, 28 may be titled upwards such that it is difficult or not possible to locate a floor object based on the present depth information alone. Step 1204 is a determination whether a floor object was successfully determined. If so, then in step 1206, the position of the sensors 25, 28 is determined. In step 1206, the relative angle of the depth camera system 20 with some reference plane may be determined. For example, referring to FIGS. 4A-4C, there may be an accelerometer 42 in the main body 40 of the depth camera 20 that facilitates determination of the angle θ. In step 1206, the height of the sensor from the floor may also be determined. This determination may be made based on the angle θ and information in the depth image. For example, based on knowledge of where the floor is in the depth image (or voxels) and the angle θ, the height of the sensor from the floor may be determined. In one embodiment, referring to FIGS. 5A-5C an angle α may be determined in order to determine a z-x orientation of the sensor.

As noted above, in some cases, there will not be a floor object presently in view (step 1204 is no). In this case, a determination may be made whether a floor object was determined previously. For example, a floor might have been detected when the sensors 25, 28 was previously in another orientation. For example, step 1206 might have previously been performed for a different sensor position. If this is the case, then the sensor position may be determined in step 1210. In step 1210, the sensor position may be determined based on knowledge of where the floor is from the previous sensor position and data acquired from an accelerometer 42. For example, previously the main body 20 might have been in a position as depicted in FIG. 4A. However, now the main body 20 may be in the position depicted in FIG. 4C. The height of the main body 20 from the floor may be assumed to be the same as before. If this assumption is incorrect, later verification can correct this assumption. The accelerometer data can be used to determine the angle θ.

As noted, in some cases the floor might never have been detected (step 1208 is no). In this case, the sensors 25, 28 may be re-oriented to capture the floor. For example, the main body 40 might be moved to the position depicted in FIG. 4A, or another angle. Then, the light sensor 25 may be operated to collect depth information such that the floor object may be located. From this information, the height of the sensors 25, 28 from the floor may be determined. Next, in step 1214, the sensors 25, 28 may be moved back to the position it was in when process 1200 was started. The angle θ of the main body 40 of the depth camera 40 may then be determined based on accelerometer data.

Technology herein may be described in the general context of computer-executable instructions, such as program modules, being executed by a computer. Generally, program modules include routines, programs, objects, components, data structures and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

Figure 13:
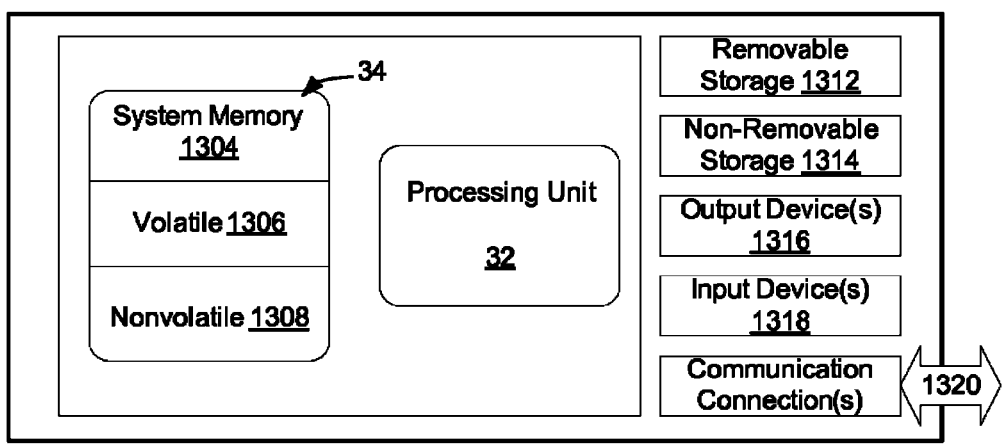
FIG. 13 depicts an example block diagram of a computing environment that may be used in a depth camera.

FIG. 13 depicts an example block diagram of a computing environment 1300 for implementing the present technology. The logic 31 in the depth sensor 20 may be implemented by computing environment 1300. In its most basic configuration, the computer 1300 typically includes a processing unit 32 and memory 34. Depending on the exact configuration and type of computing device, memory 34 may be volatile (such as RAM), non-volatile (such as ROM, flash memory, etc.) or some combination of the two. Additionally, computer 1300 may also have mass storage (removable 1312 and/or non-removable 1314) such as magnetic or optical disks or tape. Similarly, computer 1300 may also have input devices 1318 and/or output devices 1316. Other aspects of device 1300 may include communication connections 1320 to other devices, computers, networks, servers, etc. using either wired or wireless media. For example, communication connection 1320 may be used to connect computing environment 1300 with computing environment 12.

In one embodiment, to implement embodiments of processes described herein computer readable instructions that are stored on computer readable media are executed on a processor. Computer 1300 may include a variety of computer readable media. Computer readable media can be any available media that can be accessed by computer 1300 and includes both volatile and nonvolatile media, removable and non-removable media. By way of example, and not limitation, computer readable media may comprise computer storage media and communication media. Computer storage media includes volatile and nonvolatile, as well as removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other storage medium which can be used to store the desired information and which can be accessed by computer 1310. Communication media typically embodies computer readable instructions, data structures, program modules or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as radio frequency and other wireless media. Combinations of any of the above are also included within the scope of computer readable media.

Figure 14:
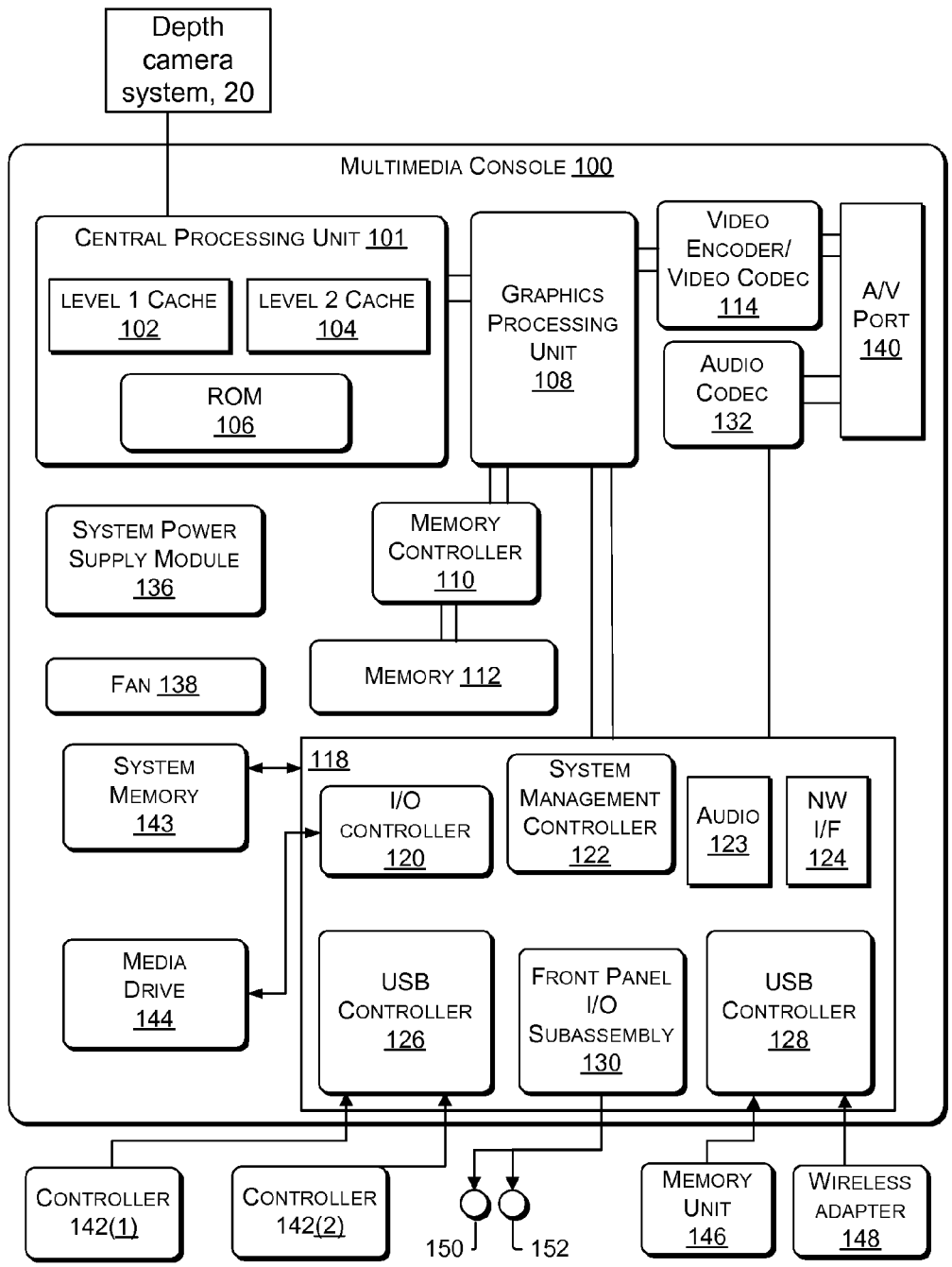
FIG. 14 depicts another example block diagram of a computing environment that may be used for the motion capture system of FIG. 1A.

FIG. 14 depicts an example block diagram of a computing environment that may be used to generate and process sensor signals. The computing environment can be used in the motion capture system of FIG. 1A or 1B. The computing environment such as the computing environment 12 described in FIG. 2A or 2B may include a multimedia console 100, such as a gaming console.

The console 100 may receive inputs from the depth camera system 20. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106 such as flash ROM may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory). The A/V port 140 may be connected to display 196.

The multimedia console 100 includes an I/O controller 120, a system management controller 122, an audio processing unit 123, a network interface 124, a first USB host controller 126, a second USB controller 128 and a front panel I/O subassembly 130 that may be implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high-speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the AN port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation may be large enough to contain the launch kernel, concurrent system applications and drivers. The CPU reservation is may be constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory for an overlay may depend on the overlay area size and the overlay may scale with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications may be scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager may control the switching of input stream, without knowledge the gaming application's knowledge and a driver maintains state information regarding focus switches.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method of orienting a sensor, comprising:
generating a depth image from a sensor having a field of view;
determining one or more potential targets based on the depth image;
selecting one of the potential targets as a candidate object to track with the sensor;
determining whether to re-orient the sensor based on the present orientation of the sensor and a position of the candidate object in the field of view;
re-orienting the sensor if it is determined to do so; and
repeating the generating depth information, the determining one or more potential targets, the selecting, the determining whether to re-orient the sensor, and the re-orienting the sensor until it is determined not to re-orient the sensor.

2. The method of claim 1, wherein the depth image is divided into a plurality of regions having depth values, and wherein the determining one or more potential targets based on the depth image includes:
grouping regions of the depth image that have a depth value that is within a pre-determined amount of the depth value of an adjacent region.

3. The method of claim 1, wherein the re-orienting the sensor includes moving the sensor to include more of the candidate object within the field of view of the sensor.

4. The method of claim 1, wherein the re-orienting the sensor includes moving the sensor to position the candidate object in the field of view of the sensor in accordance with directions from an application that a user is able to interact with through input from the sensor.

5. The method of claim 1, further comprising:
sending a list of the one or more potential targets to a software application that reacts to user actions that are identified based on input from the sensor, wherein the selecting one of the potential targets as a candidate object to track with the sensor is based on input from the application.

6. The method of claim 1, further comprising:
instructing a user to move to a different location; and
repeating the generating depth information, the determining one or more potential targets, the selecting, and the determining whether to re-orient the sensor for at least one additional sensor orientation after instructing the user to move.

7. The method of claim 1, wherein the selecting one of the potential targets as a candidate object is based on one or more of height, width or depth of the potential targets.

8. The method of claim 1, further comprising determining a present physical position of the sensor based on a depth image that was acquired with the sensor in a previous orientation and accelerometer data associated with the present sensor position.

9. An apparatus, comprising:
a depth camera having one or more sensors, at least one of the one or more sensors is able to collect depth information and having a field of view; and
logic coupled to the depth camera, the logic generates a depth image from the depth information;
the logic determines one or more potential targets based on the depth image;
the logic selects one of the potential targets as a candidate object to track with the sensor;
the logic determines whether to re-orient the one or more sensors based on the present orientation of the one or more sensors and a position of the candidate object in the field of view;
the logic re-orients the one or more sensors if it is determined to do so; and
the logic repeats the generating depth information, the determining one or more potential targets, the selecting, the determining whether to re-orient the one or more sensors, and the re-orienting the one or more sensors until it is either determined that a current candidate object is properly within the field of view or that there are no potential targets.

10. The apparatus of claim 9, wherein the depth image is divided into a plurality of regions having depth values, and wherein the logic groups regions of the depth image that have a depth value that is within a pre-determined amount of the depth value of an adjacent region as a part of the determining one or more potential targets based on the depth image.

11. The apparatus of claim 9, wherein the logic moves the one or more sensors to include more of the candidate object within a field of view of the one or more sensors in order to re-orient the one or more sensors.

12. The apparatus of claim 9, wherein the logic receives directions from an application that a user is able to interact with through depth camera input, the logic uses the directions to determine how to re-orient the one or more sensors.

13. The apparatus of claim 9, wherein the logic selects the candidate object to track based on input from an application with which a user is able to interact with based on depth information collected by the depth camera.

14. The apparatus of claim 9, wherein the logic selects the candidate object to based on one or more of height, width or depth of potential targets.

15. The apparatus of claim 9, wherein the logic includes:
a processor; and
a computer readable medium coupled to the computer processor, the computer readable medium includes instructions which when executed on the processor cause the processor to implement the logic.

16. The apparatus of claim 9, wherein the one or more sensors include an RGB camera.

17. A method of orienting a depth camera, the method comprising:
a) generating a depth image from the depth camera having one or more sensors, the depth camera having a field of view;
b) determining zero or more potential targets based on the depth image;
c) determining whether to re-orient the field of view of the depth camera if zero potential targets were determined;
d) re-orienting the field of view of the depth camera if it is determined to re-orient when zero potential targets were determined;
e) selecting one of the potential targets as a candidate object to track with the one or more sensors;
f) determining whether to re-orient the field of view of the depth camera based on the present orientation of the sensor and the candidate object;
g) re-orienting the field of view of the depth camera if it is determined to do so; and repeating said a) through g) until it is determined that the field of view of the depth camera should not be re-oriented.

18. The method of claim 17, further comprising positioning the field of view of the depth camera in a way to capture a possible user if it is determined to not re-orient when zero potential targets were determined.

19. The method of claim 17, further comprising determining voxels from the depth image, the potential targets are determined based on identifying groups of voxels that are near each other in 3D-space.

20. The method of claim 17, further comprising:
determining a location for a user based on the depth image;
instructing the user to move to the location; and
performing said a) through g) after instructing the user to move to the location.

* * * * *